United States Patent
Lewis et al.

(10) Patent No.: US 11,412,008 B2
(45) Date of Patent: *Aug. 9, 2022

(54) SYSTEM, METHOD, AND COMPUTER-READABLE MEDIUM FOR BY-PASSING THE PUBLIC SWITCHED TELEPHONE NETWORK WHEN INTERCONNECTING AN ENTERPRISE NETWORK AND A CARRIER NETWORK

(71) Applicant: TANGO NETWORKS, INC., Frisco, TX (US)

(72) Inventors: Lathan W. Lewis, Dallas, TX (US); Andrew Silver, Frisco, TX (US)

(73) Assignee: TANGO NETWORKS, INC., Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/075,657

(22) Filed: Oct. 20, 2020

(65) Prior Publication Data
US 2021/0037066 A1 Feb. 4, 2021

Related U.S. Application Data

(63) Continuation of application No. 16/134,629, filed on Sep. 18, 2018, now Pat. No. 10,812,538, which is a continuation of application No. 14/708,712, filed on May 11, 2015, now Pat. No. 10,079,862, which is a
(Continued)

(51) Int. Cl.
*H04L 12/66* (2006.01)
*H04L 65/1069* (2022.01)
*H04M 7/00* (2006.01)

(52) U.S. Cl.
CPC ...... *H04L 65/1069* (2013.01); *H04M 7/0075* (2013.01)

(58) Field of Classification Search
CPC ... H04L 65/1069; H04L 65/13; H04L 65/104; H04L 61/308; H04M 3/436; H04M 7/128; H04M 7/126; H04M 7/006
See application file for complete search history.

(56) References Cited

U.S. PATENT DOCUMENTS

| 5,838,769 A | * | 11/1998 | McNeil | H04M 3/2272 379/14 |
| 7,284,058 B1 | * | 10/2007 | Synnestvedt | H04L 65/1073 709/203 |
| 8,649,497 B1 | | 2/2014 | Shea | |

(Continued)

FOREIGN PATENT DOCUMENTS

WO    0005861 A1   2/2000

*Primary Examiner* — Abdelnabi O Musa (57) ABSTRACT

A system, method and computer-readable medium by-passing the public switched telephone network when routing a call from a carrier network to an enterprise network are provided. A carrier gateway server is communicatively coupled with an enterprise gateway server. The enterprise gateway server is adapted to publish direct inward dial numbers assigned to enterprise extensions to the carrier gateway server. Once published, call setups originated in the carrier network may be routed directly to an enterprise network having a terminal assigned the dialed number of the call setup. Advantageously, the carrier network operator does not incur any inter-connect fee from any public switched network operator.

20 Claims, 6 Drawing Sheets

Related U.S. Application Data continuation of application No. 11/840,819, filed on Aug. 17, 2007, now Pat. No. 9,031,220.

(56) References Cited

U.S. PATENT DOCUMENTS

| | | | |
|---|---|---|---|
| 9,031,220 B2 | 5/2015 | Lewis et al. | |
| 2002/0118800 A1* | 8/2002 | Martinez | H04M 3/42204 379/67.1 |
| 2002/0159440 A1* | 10/2002 | Mussman | H04L 65/103 370/352 |
| 2005/0078814 A1* | 4/2005 | Cavalcanti | H04M 15/83 379/221.01 |
| 2007/0121884 A1* | 5/2007 | Sin | H04L 61/308 379/219 |

* cited by examiner

Fig. 8

SYSTEM, METHOD, AND COMPUTER-READABLE MEDIUM FOR BY-PASSING THE PUBLIC SWITCHED TELEPHONE NETWORK WHEN INTERCONNECTING AN ENTERPRISE NETWORK AND A CARRIER NETWORK

CROSS REFERENCE TO RELATED APPLICATIONS

This application is a continuation of U.S. patent application Ser. No. 16/134,627, filed on Sep. 18, 2018, now U.S. Pat. No. 10,812,538, issued on Oct. 20, 2020, which is a continuation of U.S. patent application Ser. No. 14/708,712, filed on May 11, 2015, now U.S. Pat. No. 10,079,862, issued on Sep. 18, 2018, which is a continuation of U.S. patent application Ser. No. 11/840,819, filed on Aug. 17, 2007, now U.S. Pat. No. 9,031,220 on May 12, 2015, the disclosures of which are incorporated herein by reference in their entirety.

FIELD OF THE INVENTION

The present disclosure relates to telecommunications and, more particularly, to telecommunications mechanisms including interconnection of enterprise network terminals with carrier network terminals.

BACKGROUND

Corporations are increasingly relying on the use of cellular technology by their employees, yet enterprises do not have adequate means to control cellular service in terms of costs, Quality of Service, and corporate monitoring. This is because cellular service has conventionally been controlled by wireless carrier networks and managed independently of, and with no connectivity to, the enterprise voice and data networks.

Enterprises may assign cellular telephones to employees to provide high availability of employee communication capabilities. Employees may frequently call terminals deployed in an enterprise network from the carrier network. In doing so, interconnect fees are incurred when the call is routed from the carrier network to the public switched telephone network prior to termination of the call in the enterprise network. Heretofore, no mechanisms have been provided that allow enterprise networks to manage routing tables for mapping direct inward dial numbers to a particular enterprise network thereby allowing an enterprise to directly interconnect a terminal in a carrier network with a terminal in an enterprise network without a public switched telephone network interconnection.

SUMMARY OF THE INVENTION

Embodiments disclosed herein provide mechanisms for by-passing the public switched telephone network when routing a call from a carrier network to an enterprise network. A carrier gateway server is communicatively coupled with an enterprise gateway server. The enterprise gateway server is adapted to publish Direct Inward Dial numbers assigned to enterprise extensions to the carrier gateway server. Once published, call setups originated in the carrier network may be routed directly to an enterprise network having a terminal assigned the dialed number of the call setup. Advantageously, the carrier network operator does not incur any inter-connect fee from any public switched network operator.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
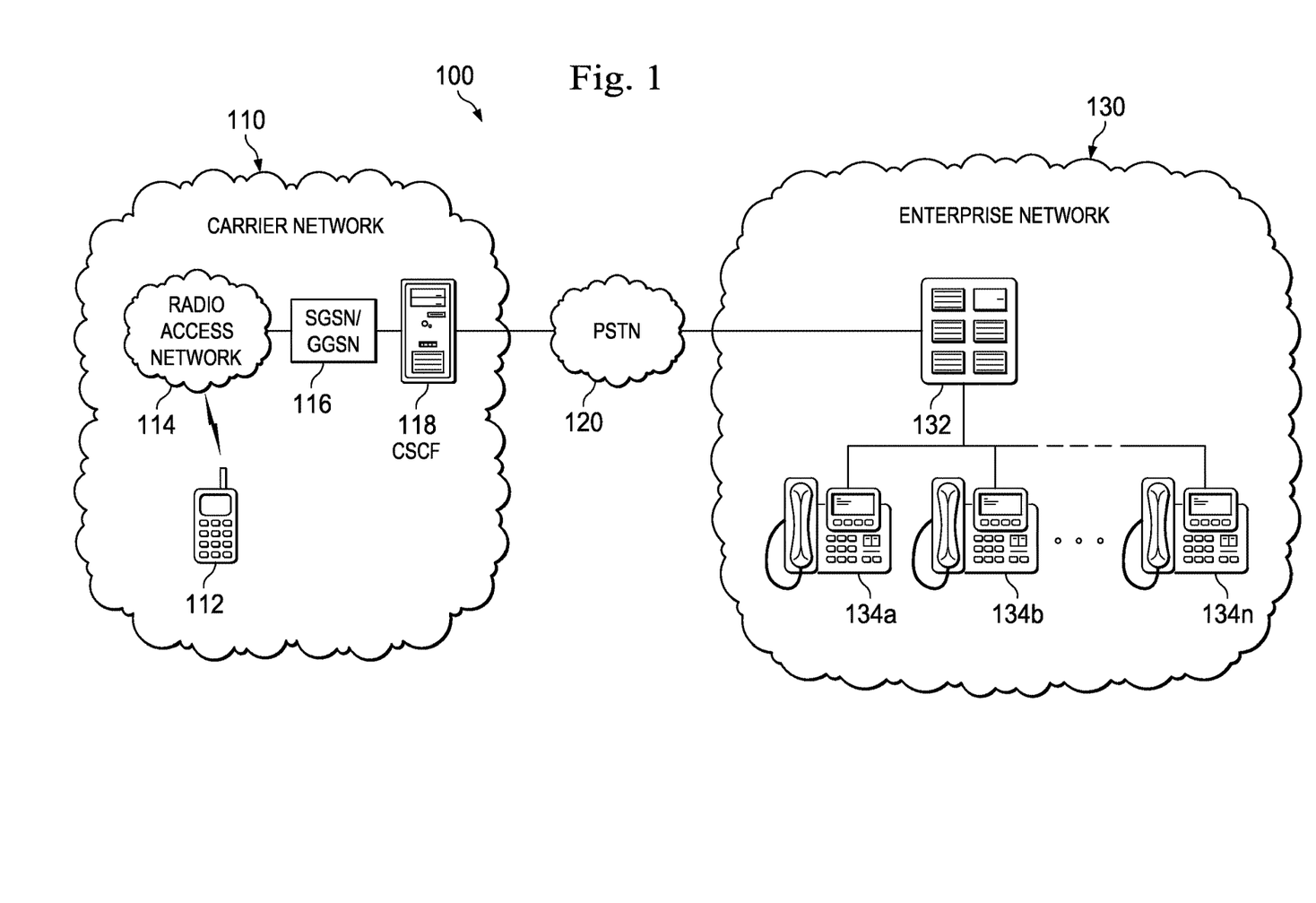
FIG. 1 is a diagrammatic representation of a network system adapted to interconnect a terminal deployed in a carrier network with an enterprise terminal.

FIG. 1 is a diagrammatic representation of a network system adapted to interconnect a terminal deployed in a carrier network with an enterprise terminal. Carrier network 110 may comprise an IP Multimedia Subsystem (IMS) architecture adapted to provide IP service to a terminal device 112. Terminal device 112, also referred to as user equipment (UE), may be implemented as a personal digital assistant (PDA), a mobile phone, a computer, or another device adapted to interface with carrier network 110. In the illustrative example, terminal device 112 comprises a mobile terminal and thus accesses carrier network 110 via a radio access network 114 over an air interface. Radio access network 114 may comprise various base transceiver stations (BTSs) and associated base station controllers (BSCs) as well as other infrastructure. RAN 114 is communicatively coupled with a serving general packet radio service (GPRS)

support node (SGSN) and a gateway GPRS support node (GGSN). In the illustrative example, the SGSN and GGSN are represented as SGSN/GGSN 116, although it is understood that the SGSN and GGSN may, and often are, implemented as separate network entities. SGSN/GGSN 116 is communicatively coupled with a call session control function (CSCF) 118 that interfaces with the public switched telephone network (PSTN) 120, e.g., via a signaling gateway and a media gateway. PSTN 120 interfaces with enterprise network 130, e.g., by a tandem or other switch with an enterprise private branch exchange (PBX) 132, e.g., via trunk lines. Private branch exchange 132 provides service to any number of extensions, e.g., enterprise terminal devices 134a-134n.

When a terminal deployed in carrier network 110 places a call to a terminal in enterprise network 130, the call setup is passed from RAN 114 to CSCF 118 that determines the destination number is not allocated for a carrier network terminal. CSCF 118 then passes the call setup to PSTN 120 that determines proper routing for the request and ultimately relays the request to enterprise network 130. The call set up is then completed, and the call is terminated with the originating terminal in carrier network 110 with the call terminal in enterprise 130. Disadvantageously, an interconnect fee is incurred for accessing PSTN 120 as is understood.

In accordance with the present disclosure, the enterprise network is adapted to publish direct inward dial (DID) numbers in a carrier network. In a particular implementation, a carrier gateway server inter-connects the carrier network with an enterprise gateway server deployed in the enterprise network. The enterprise gateway server is adapted to publish DID numbers assigned to enterprise extensions to the carrier gateway server. Once published, the carrier network can then use this information to route calls outbound from the carrier network directly to the enterprise network. By routing direct to the enterprise network, the carrier network service provider does not incur any interconnect fees from the PSTN operators. Direct routing can be via either standard time division multiplex (TDM) mechanisms, for example primary rate interface (PRI), voice over Internet Protocol (VoIP) via session initiation protocol (SIP) or H.323 trunks, or by any other suitable mechanism.

Figure 2:
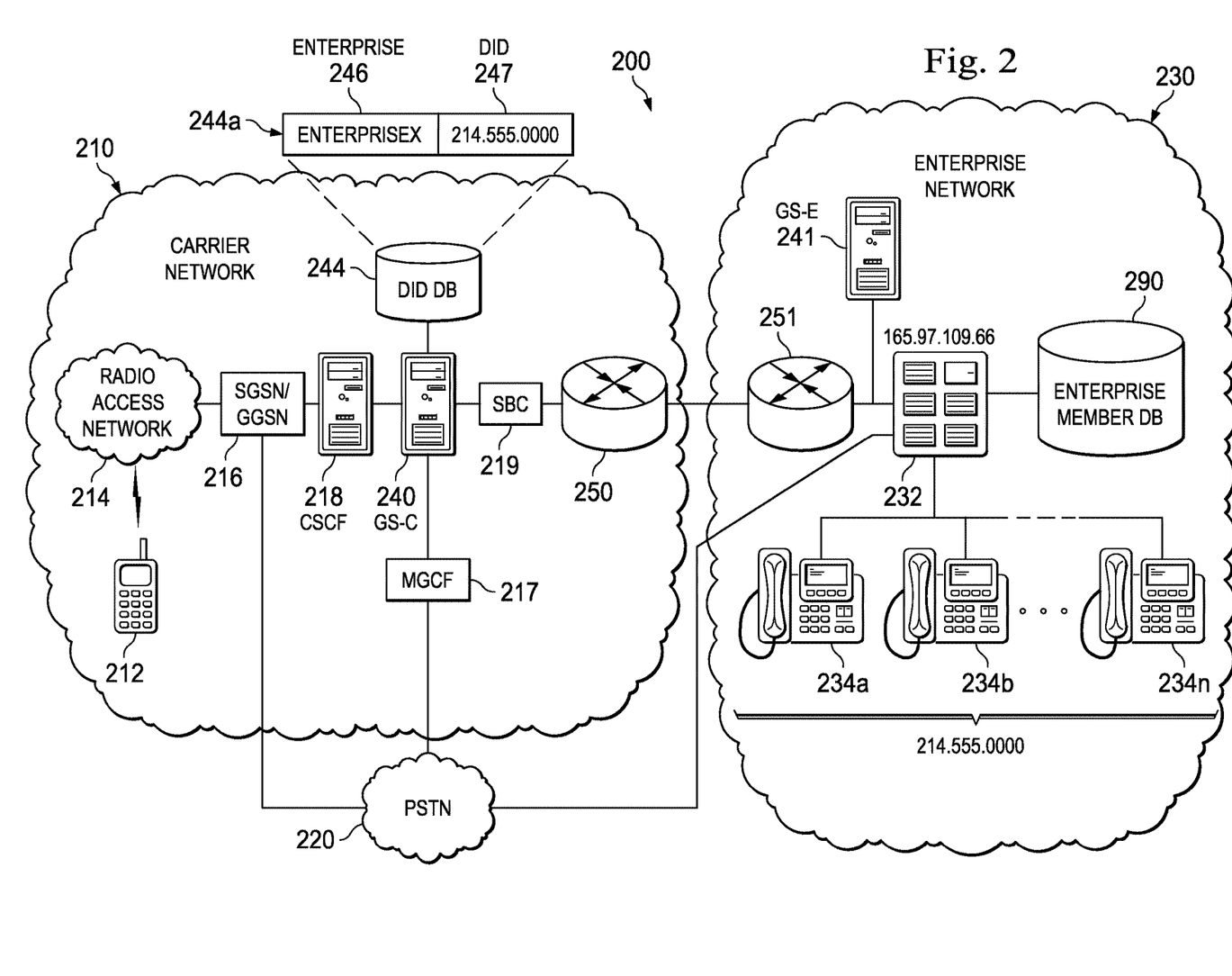
FIG. 2 is a diagrammatic representation of a network system architecture in which embodiments disclosed herein may be implemented.

FIG. 2 is a diagrammatic representation of a network system 200 architecture in which embodiments disclosed herein may be implemented. Carrier network 210 may comprise an IMS architecture adapted to provide IP service to a terminal device 212. Terminal device 212 may be implemented as a PDA, a mobile phone, a computer, or another device adapted to interface with carrier network 210. In the illustrative example, terminal device 212 comprises a mobile terminal and thus accesses carrier network 210 via a radio access network 214 over an air interface. Radio access network 214 may comprise, for example, a Global System for Mobile (GSM) Communications access network, a code division multiple access network, a mobile network utilizing IMT-2000, a WiMAX network, or another suitable access network. RAN 214 is communicatively coupled with a SGSN/GGSN 216. SGSN/GGSN 216 is communicatively coupled with a CSCF 218. In an exemplary embodiment, CSCF 218 is interfaced with a carrier gateway server (GS-C) 240 that may provide connectivity with an enterprise network, e.g., via routers 250-251. CSCF 218 may additional interface with PSTN 220, e.g., via a signaling gateway and a media gateway. A media gateway controller function (MGCF) 217 may perform call control conversion between SIP and ISUP and may interface with a signaling gateway (not shown) for interfacing with a circuit switched signaling plane of PSTN 220. A session border controller (SBC) 219 may provide control over the signaling and media streams involved in setting up, conducting, and tearing down calls.

Enterprise network 230 may include a PBX 232 that provides service to any number of extensions, e.g., enterprise terminal devices 234a-234n. Additionally, PSTN 220 may interface with enterprise network 230, e.g., by a tandem or other switch coupled with PBX 232 via trunk lines. Enterprise network 230 includes an enterprise gateway server (GS-E) 241 that may be communicatively coupled with GS-C 240.

GS-E 241 may interact with GS-C 240 deployed in the carrier network. The connection between GS-C 240 and GS-E 241 may be made over, for example, session initiation protocol (SIP) or other protocols. This configuration may enable carrier network 210 to have a central point of control for interacting with multiple enterprises, and may not require the use of SS7 messaging to the enterprise. Rather, it is possible to have a secure IP connection supporting SIP. This is also useful for offering a Centrex solution for interconnecting with a carrier-hosted PBX, or for interconnecting a carrier-hosted gateway server with enterprise-hosted PBX systems. GS-C 240 may support an SS7 point code multiplexer in which only one or two point codes are needed to address all enterprises since GS-C 240 can identify for which enterprise a message is intended. GS-E 241 may be adapted to provision GS-C 240 automatically over an IP interface to manage subscribers, e.g., to add new pilot directory numbers for new subscribers. In this case, originating and terminating triggers used in carrier network 210 for routing calls to GS-C 240 can add identifying information of the specific enterprise in the triggering messages. Alternatively, GS-C 240 may identify the enterprise based on the calling party information.

PBX 232 may include or interface with an Enterprise member database 290 that stores records or profiles that define services for members of enterprise network 230. GS-E 241 may interface with member database 290 via a provisioning interface specific to PBX 232. Enterprise member database 290 may include records that specify enterprise members and DID numbers of telephony devices allocated thereto. In accordance with an embodiment, DID numbers of enterprise extensions are published to GS-C 240 to facilitate by-passing PSTN 220 when routing a call from a call originator in carrier network 210 to a device terminated in enterprise network 230. To this end, GS-E 241 may retrieve DID numbers maintained in enterprise member database 290 and transmit the retrieved DID numbers to GS-C 240. For example, GS-E 241 may be notified or detect any new entries, or changes to an existing DID number, in enterprise member database 290. In response to the addition or modification of a DID number, GS-E 241 may transmit the new or modified DID number to GS-C 240.

GS-C 240 maintains or otherwise interfaces with a DID database 244 that stores DID numbers received by GS-C 240. In an exemplary embodiment, DID numbers may be associated with an address or identifier, such as a domain, of the associated enterprise. For instance, assume enterprise terminal 234a has a DID number of "214.555.0000" and enterprise 230 has a domain of "EnterpriseX". The DID number of terminal 234n is published by GS-E 241 to GS-C 240 and is maintained in a record 244a in DID database 244. Record 244a stores the domain or other address or identifier of enterprise network in Enterprise field 246 and the DID number of the terminal in DID field 247 thereby associating the DID number of terminal device 234a with enterprise network 230. Other terminals of enterprise network 230 and other enterprise networks may similarly have records allocated therefor in DID database 244.

When a call is placed from a terminal device in carrier network 210 to an enterprise terminal device for which the DID number has been published to GS-C 240, the carrier network infrastructure routes the call from the originating device to GS-C 240. GS-C 240 interrogates DID database 244 to determine whether to route the call directly or route the call via PSTN 220. If the DID number is recognized by GS-C 240, routing the call directly is preferred if a trunk is available as doing so does not incur an interconnect fee.

GS-E 241 may use provisioning interfaces specific to enterprise PBX 232 to automatically retrieve DID numbers. If unavailable from PBX 232, GS-E 241 may be adapted to allow the enterprise administrator to directly provision the DIDs. GS-E 241 then publishes the DIDs to GS-C 240 via a Web Services Interfaces, such as Simple Object Access Protocol (SOAP).

GS-C 240 may be implemented differently depending on the network switching technology used in the carrier's network. For IMS networks, GS-C 240 may be implemented as a Breakout Gateway Control Function (BGCF) as defined by 3GPP/3GPP2 standards.

Figure 3:
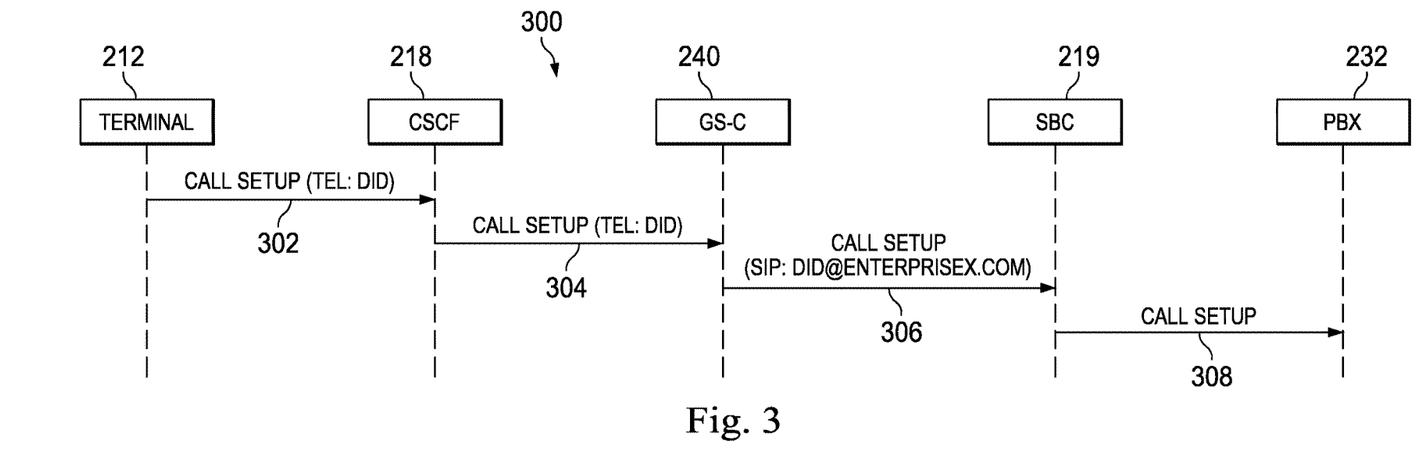
FIG. 3 is a diagrammatic representation of a call flow for routing a call directly to an enterprise network via a VoIP connection in accordance with an embodiment.

In an IMS network, GS-C 240 decides based on DID database 244 and the dialed number whether or not to forward the call directly to the enterprise or through the PSTN via MGCF 217. FIG. 3 is a diagrammatic representation of a call flow 300 for routing a call directly to an enterprise via a VoIP connection in accordance with an embodiment.

In the following example, assume a call is placed at terminal 212 operating in carrier network 210 and is placed to enterprise terminal 234a. The call setup is transmitted from terminal 212 to CSCF 218, e.g., via RAN 214 (step 302). The call setup includes the DID of the destination device to which the call is directed. The call set up is then forwarded to GS-C 240 (step 304). GS-C 240 examines the DID of the destination terminal and interrogates DID database 244 with the DID. If the DID read from the call setup matches a DID in DID database 244, the call may be routed directly to the enterprise if sufficient trunk capacity is available. In the present example, assume the destination terminal has a record allocated therefor in DID database 244 and sufficient capacity exists for routing the call through the carrier network. Accordingly, GS-C 240 retrieves an identifier, e.g., the domain, of the enterprise network associated with the destination terminal's DID and generates a call setup including a SIP URL that specifies the DID and the enterprise domain (enterpriseX in the illustrative example). The call setup is then forwarded to SBC 219 (step 306), and the call setup is routed to PBX 232 via the carrier infrastructure for termination therewith (step 308). Thus, PSTN 220 is by-passed for the call setup, and an interconnect charge is advantageously avoided.

Figure 4:
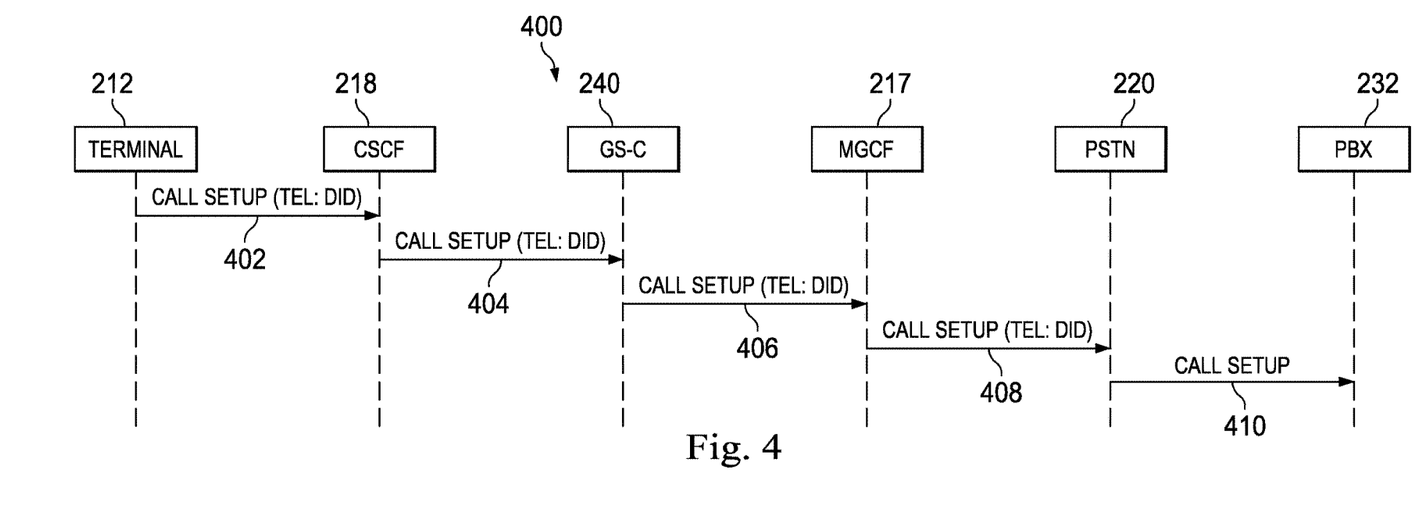
FIG. 4 is a diagrammatic representation of a call flow for routing a call through a public switched telephone network when a destination enterprise terminal does not have an associated direct inward dial number published to a carrier gateway server in accordance with an embodiment.

FIG. 4 is a diagrammatic representation of a call flow 400 for routing a call through a PSTN when a destination enterprise terminal does not have an associated DID published to a carrier gateway server in accordance with an embodiment.

In the following example, assume a call is placed at terminal 212 operating in carrier network 210 and is directed to enterprise terminal 234a. The call setup is transmitted from terminal 212 to CSCF 218, e.g., via RAN 214 (step 402). The call setup includes the DID of the destination device to which the call is directed. The call setup is then forwarded to GS-C 240 (step 404). GS-C 240 examines the DID of the destination terminal and interrogates DID database 244 with the DID. In the present example, assume the destination terminal does not have a record allocated therefor in DID database 244. Upon a determination that a record does not exist in DID database 244 for the DID, GS-C 240 then forwards the call setup to MGCF 217 (step 406) that, in turn, forwards the call setup to PSTN 220 (step 408) that routes the call to PBX 232 (step 410).

In a GSM network, the carrier gateway server may be implemented as a type of softswitch. In this configuration, mobile switching centers in the carrier's network will route all off-net numbers to the softswitch for routing. As in the IMS case, the GS-C acting as a softswitch decides based on its internal DID directory and the dialed number whether or not to forward the call directly to the enterprise or through the PSTN.

Figure 5:
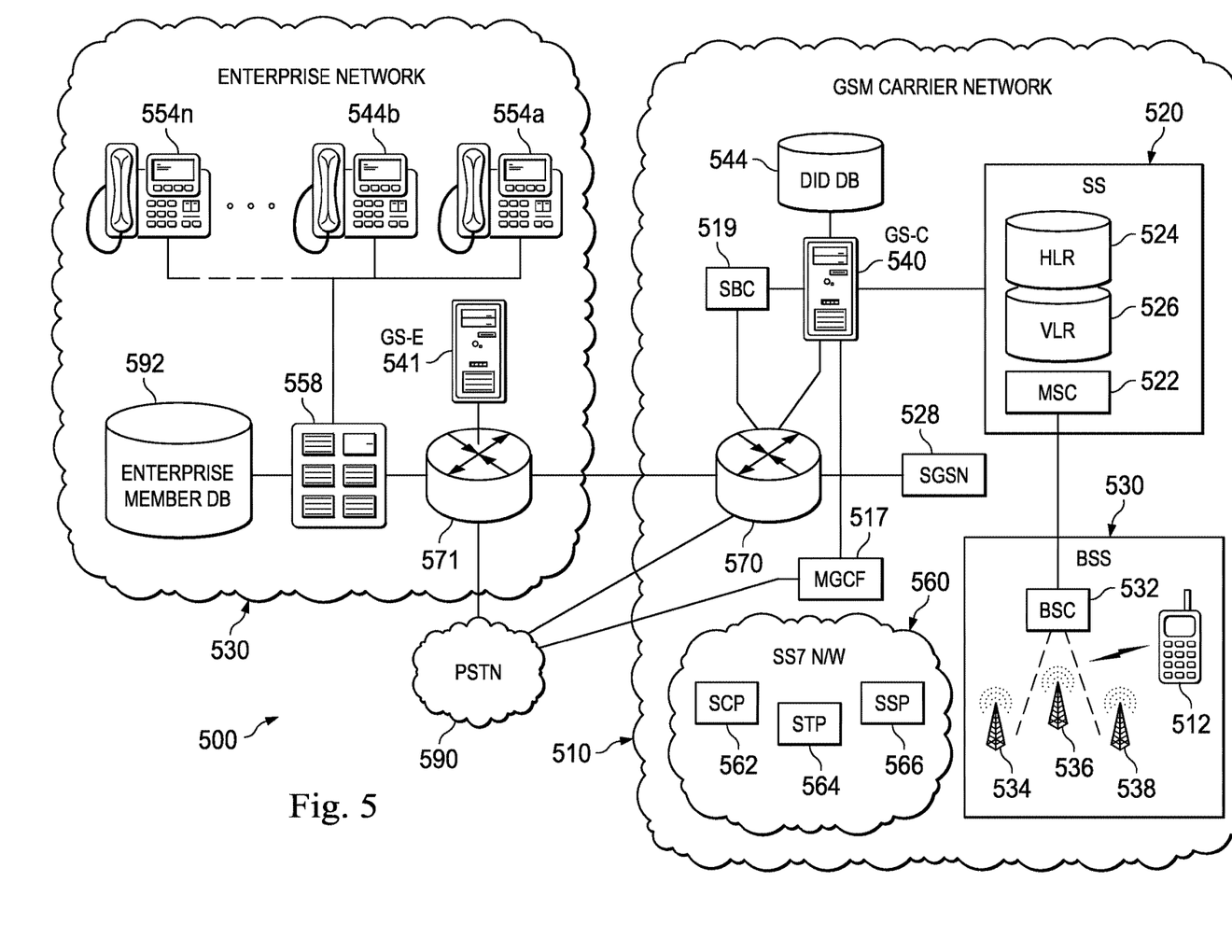
FIG. 5 is a simplified diagrammatic representation of a network system including a GSM carrier network in which embodiments disclosed herein may be implemented for by-passing the public switched telephone network for carrier-to-enterprise calls.

FIG. 5 is a simplified diagrammatic representation of a network system 500 including a GSM carrier network in which embodiments disclosed herein may be implemented for by-passing the PSTN for carrier-to-enterprise calls. System 500 may include a cellular carrier network 510, such as a GSM Communications network. Carrier network 510 generally includes a Switching System (SS) 520 and a Base Station System (BSS) 530.

Each of SS 520 and BSS 530 contain a number of functional units well understood by those skilled in the art, and a detailed explanation of the various components is unnecessary. Nevertheless, a cursory review of various components is provided. SS 520 includes a Mobile services Switching Center (MSC) 522, a Home Location Register (HLR) 524, and a Visitor Location Register (VLR) 526. MSCs carry out switching functions and manage the communications between mobile phones and the Public Switched Telephone Network (PSTN) 590. HLR 524 comprises the central database that contains details of each mobile phone subscriber that is authorized to use the cellular core network. VLR 526 comprises a database which stores information about all the mobiles terminals that are currently serviced by the associated MSC.

Various other sub-systems or functional modules may, and typically are, included in SS 520, such as an Authentication Center, an Equipment Identity Register, or various other functions. A serving general packet radio service (GPRS) support node (SGSN) 528 may be included in carrier network 510 to facilitate provisioning of packet services to and from mobile terminals in carrier network 510. GPRS provides mobility management, session management and transport for Internet Protocol packet services in GSM cellular packet networks.

As is understood, various GPRS infrastructure may be included in carrier network 510 to provide packet services to mobile terminals, and only SGSN 528 of the GPRS core network is depicted to simplify the discussion of embodiments disclosed herein. In general, a gateway GPRS support node may interface the GPRS backbone with an external packet network, such as the Internet.

SGSN 528 may interface with various subsystem of carrier network 510. For example, SGSN 528 may have a Gs interface with MSC 522 and VLR 526 that facilitates paging and station availability notification when performing data transfers. SGSN 528 may additionally have a Gr interface with HLR 524 through which messaging may be performed, for example, over the Mobile Application Part protocol. SGSN 528 may additionally have a Gb interface with a packet control unit (PCU) (not shown) of BSS 530 that facilitates connection of BSS 530 with SGSN 528.

Carrier network 510 may also include a signaling system, such as a SS7 network 560. SS7 network 560 provides a set of telephony signaling protocols which are used to set up the vast majority of the world's PSTN telephone calls. SS7 network 560 is also used in cellular networks, such as GSM and UMTS, for circuit switched voice and packet-switched data applications. As is understood, SS7 network 560 includes various signaling nodes, such as any number of service control points (SCPs) 562, signal transfer points (STPs) 564, and service switching points (SSPs) 566.

BSS 530 contains a Base Station Controller (BSC) 532 that may be in communication with and in control of a plurality of Base Transceiver Stations (BTSs) 534-538. Each individual BTS 534-538 under the control of a given BSC 532 may define a radio cell operating on a set of radio channels thereby providing service to a mobile terminal (MT) 512.

In accordance with an embodiment, carrier network 510 may include a GS-C 540 that may include the network functions for both voice (gateway MSC) and data (gateway GPRS Support Node or Home Agent), VoIP capability for interconnecting carrier network 510 with enterprise network 530 thereby eliminating PSTN interconnect charges, a billing gateway, and a next-generation Network Services gateway that enables third party value added services for the enterprise, such as mobile phone activation/de-activation, or other services. GS-C 540 may also include an element management subsystem (EMS) and a service management subsystem for the operational support system (OSS). GS-C 540 may be communicatively coupled with SS 520 and may include or interface with a DID database 544 in which published DID numbers are maintained. Carrier network 510 may interface with PSTN 590 and enterprise network 530, e.g., via a router 570. Additionally, carrier network may include a MGCF 517 and an SBC 519.

Enterprise network 530 may comprise, for example, a switched Ethernet that interconnects various network nodes via various network infrastructure, such as hubs and switches. In the illustrative example, enterprise network 530 includes various client nodes, such as telephony terminals 554a-554n, and a PBX 558 which terminates extensions with terminals 554a-554n. PBX 558 may include or interface with an enterprise member database 592. Enterprise network 530 may interface with the PSTN 590 via a router 571 disposed at the enterprise, and enterprise network 530 may interface with carrier network 510 via routers 570 and 571. It is understood that enterprise network 530 may, and typically does, include hundreds or thousands of client devices and networking nodes, and the architecture depicted in FIG. 1 is greatly simplified to facilitate a discussion of embodiments disclosed herein.

In accordance with an embodiment, a GS-E 541 may be deployed in enterprise network 530 that is adapted to publish DID numbers of enterprise terminals with GS-C 540 that facilitates direct connection of a carrier-originated call to an enterprise terminal. GS-E 541 may be communicatively coupled with GS-C 540. From an IT organization perspective, GS-E 541 appears as an extension to PBX 558. To carrier network 510, GS-E 541 appears as a standard in-network endpoint for delivering calls. To PBX 558, GS-E 541 appears as a set of standard PBX endpoints (e.g., deskphones, or IP clients). GS-E 541 may mediate between the two disparate sets of network protocols and state machines.

GS-E 541 may include softswitch functionality. In this configuration, MSCs in the carrier network will route all off-net numbers to the softswitch for routing. In a manner similar to the IMS implementations described hereinabove, GS-C 540, acting in this instance as a softswitch, decides based on DID database 544 and the dialed number whether or not to forward the call directly to the enterprise or through the PSTN.

Figure 6:
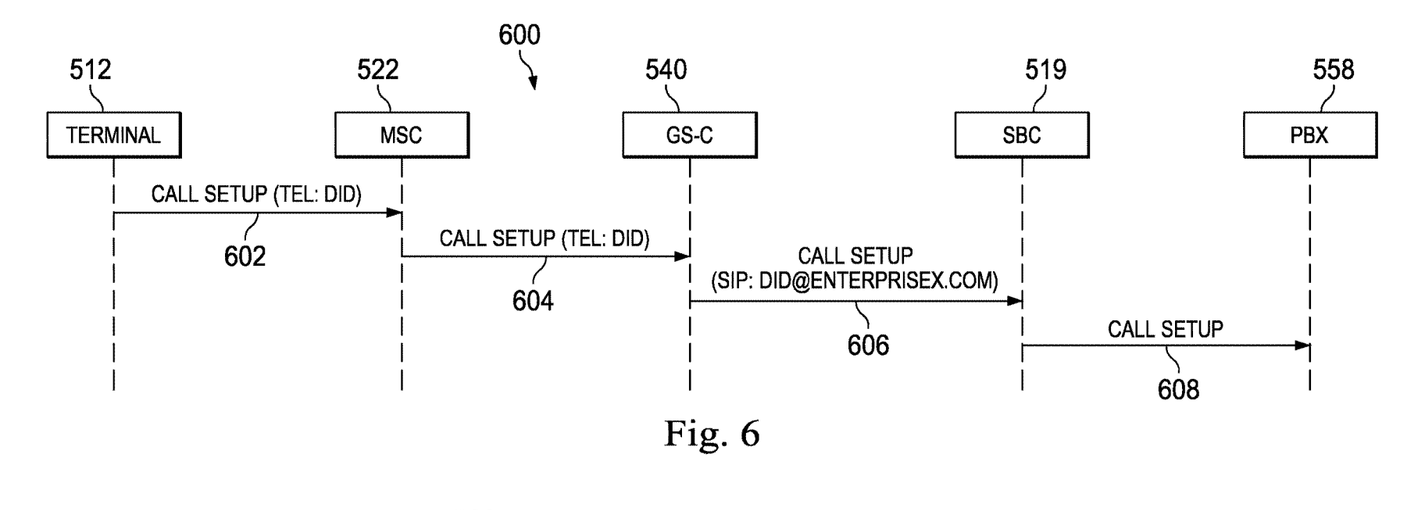
FIG. 6 is a diagrammatic representation of a call flow for routing a call directly to an enterprise network from a GSM carrier network in accordance with an embodiment.

FIG. 6 is a diagrammatic representation of a call flow 600 for routing a call directly to an enterprise from a GSM carrier network in accordance with an embodiment. In the following example, assume a call is placed at terminal 512 operating in carrier network 510 to enterprise terminal 534a. The call setup is transmitted from terminal 512 to MSC 522 (step 602). The call setup includes the DID of the destination device to which the call is directed. The call setup is then forwarded to GS-C 540 (step 604). GS-C 540 examines the DID of the destination terminal and interrogates DID database 544 with the DID. If the DID read from the call setup matches a DID in DID database 544, the call may be routed directly to the enterprise. In the present example, assume the destination terminal has a record allocated therefor in DID database 544 that associates the DID of the destination device with the domain of enterprise network 530. Accordingly, GS-C 540 retrieves the domain of enterprise network 530 and generates a call setup including a SIP URL that specifies the DID and the enterprise domain (enterpriseX in the illustrative example). The call setup is then forwarded to SBC 519 (step 606), and the call is routed to PBX 558 via the GSM network infrastructure for termination therewith (step 608). Thus, PSTN 590 is by-passed for the call setup, and an interconnect charge is advantageously avoided.

Figure 7:
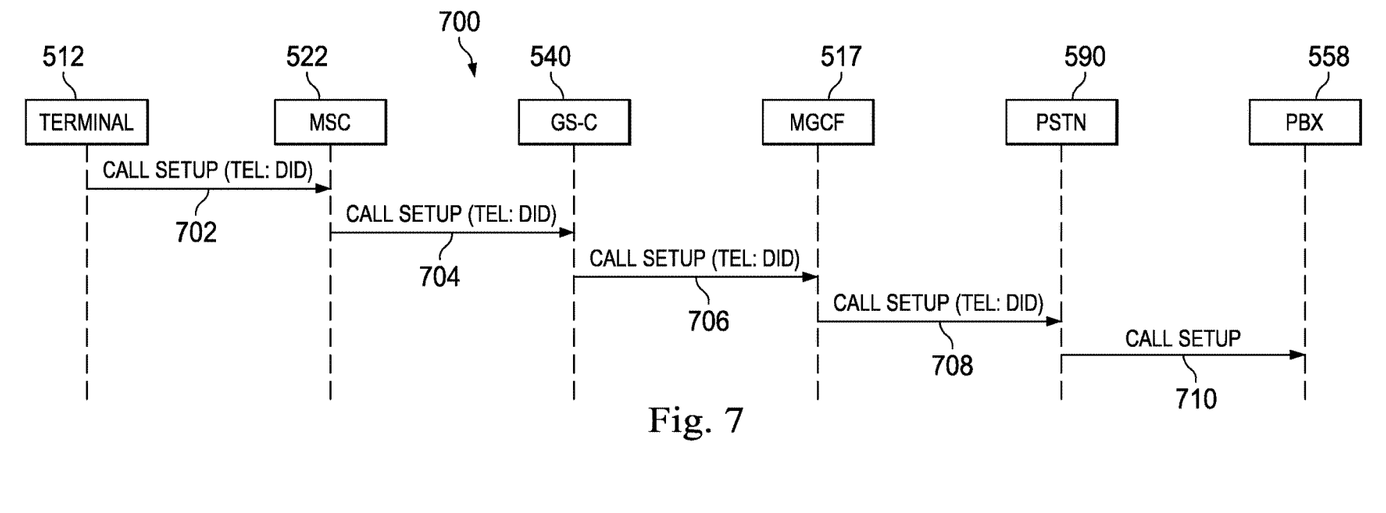
FIG. 7 is a diagrammatic representation of a call flow for routing a call through a public switched telephone network when a destination enterprise terminal does not have an associated direct inward dial number published to a carrier gateway server in accordance with an embodiment.

FIG. 7 is a diagrammatic representation of a call flow 700 for routing a call through a PSTN when a destination enterprise terminal does not have an associated DID published to a carrier gateway server in accordance with an embodiment.

In the following example, assume a call is placed at terminal 512 operating in carrier network 510 and is directed to enterprise terminal 534a. The call setup is transmitted from terminal 512 to MSC 522 (step 702). The call setup includes the DID of the destination device to which the call is directed. The call set up is then forwarded to GS-C 540 (step 704). GS-C 540 examines the DID of the destination terminal and interrogates DID database 544 with the DID. In the present example, assume the destination terminal does not have a record allocated therefor in DID database 544. Upon a determination that a record does not exist in DID database 544 for the DID, GS-C 540 then forwards the call setup to MGCF 517 (step 706) that, in turn, forwards the call setup up to PSTN 590 (step 708) that routes the call to PBX 558 (step 710).

Figure 8:
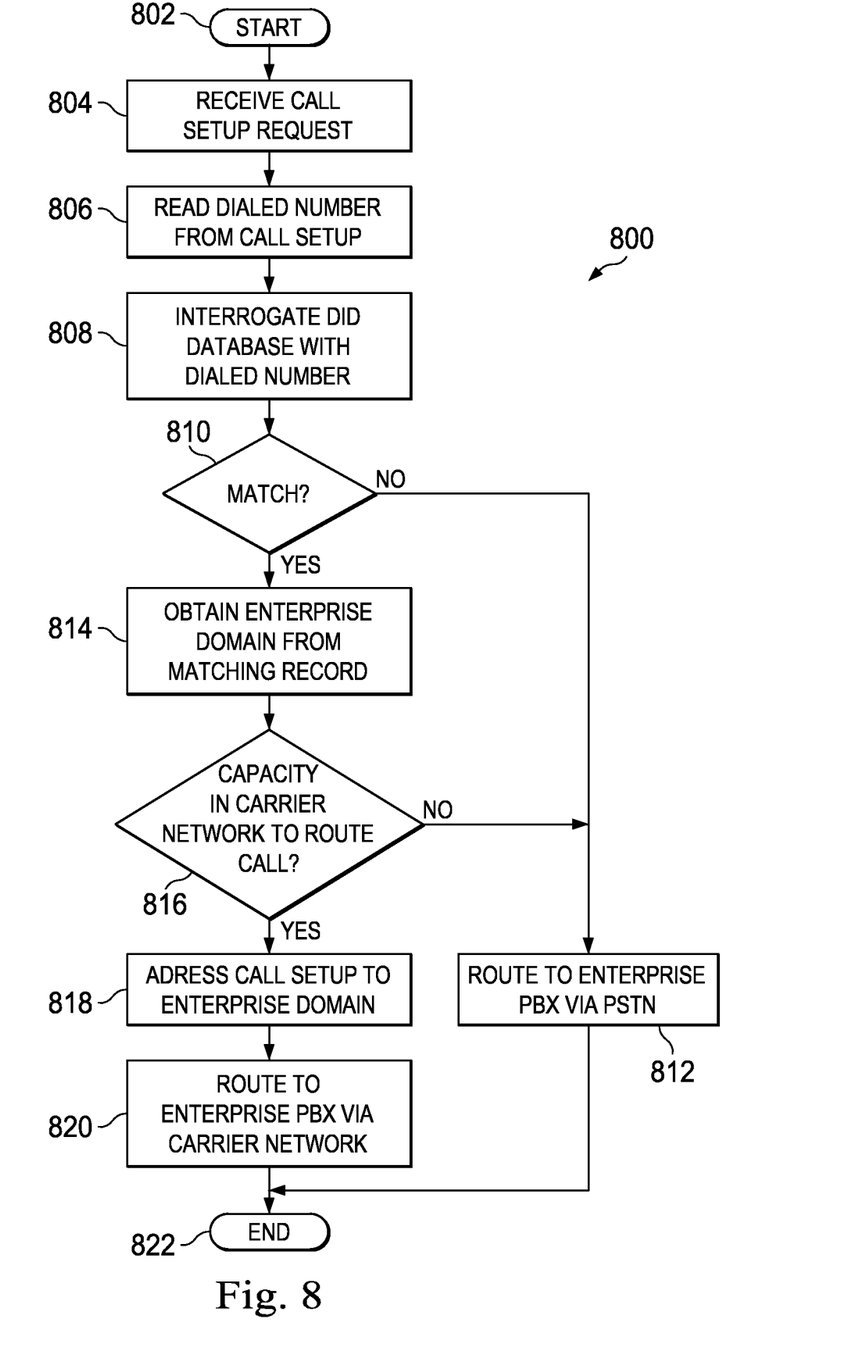
FIG. 8 is a flowchart that depicts carrier gateway server processing adapted to facilitate by-passing of the public switched telephone network when routing a carrier-originated call to an enterprise terminal in accordance with an embodiment.

FIG. 8 is a flowchart 800 that depicts carrier gateway server processing adapted to facilitate by-passing the PSTN when routing a carrier-originated call to an enterprise terminal in accordance with an embodiment.

The routine is invoked (step 802), and the carrier gateway server receives a call setup (step 804). The dialed number is then read from the call setup (step 806), and the DID database is interrogated with the dialed number read from the call setup (step 808). An evaluation is then made to determine if a match exists between the dialed number and the DID database (step 810). In the event that no match is identified, the GS-C processing routine then proceeds to route the call through the PSTN (step 812), and the GS-C processing routine may then terminate (step 822).

Returning again to step 810, in the event that a match is identified between an entry in the DID database and the dialed number read from the call setup, the GS-C may then obtain the enterprise domain associated with the dialed number from the matching entry in the DID database (step 814). The GS-C may then evaluate whether sufficient capacity, e.g., trunk lines, is available in the carrier network to route the call to the enterprise network (step 816). In the event that there is not sufficient capacity in the carrier network to route the call to the enterprise, the GS-C may proceed to route the call through the PSTN according to step 812.

Returning again to step 816, in the event that sufficient capacity exists in the carrier network to route the call to the enterprise network, the call setup is addressed to the enterprise domain, e.g., by generation of a SIP setup that includes the enterprise domain and the dialed number (step 818). The call setup is then carried out over the carrier network by completing the call with the enterprise PBX (step 820). The GS-C processing routine cycle may then end according to step 822.

As described, embodiments disclosed herein provide mechanisms for by-passing the public switched telephone network when routing a call from a carrier network to an enterprise network. A carrier gateway server is communicatively coupled with an enterprise gateway server. The enterprise gateway server is adapted to publish direct inward dial numbers assigned to enterprise extensions to the carrier gateway server. Once published, call setups originated in the carrier network may be routed directly to an enterprise network having a terminal assigned the dialed number of the call setup. Advantageously, the carrier network operator does not incur any inter-connect fee from any public switched network operator.

Although specific network architecture and nomenclature examples are depicted and described according, in one embodiment, to the GSM, it is understood that this is done so for illustrative purposes only and that the network architecture on which embodiments disclosed herein may be applied is not limited to any particular standard, but rather may be equivalently implemented on any other communications system supporting any variety of cellular communication systems, e.g. D-AMPS, GSM, CDMA, IS-41, ANSI-41, UMTS, a WiMAX network, a multimedia domain-compliant network, etc.

The flowchart of FIG. 8 depicts process serialization to facilitate an understanding of disclosed embodiments and is not necessarily indicative of the serialization of the operations being performed. In various embodiments, the processing steps described in FIG. 8 may be performed in varying order, and one or more depicted steps may be performed in parallel with other steps. Additionally, execution of some processing steps of FIG. 8 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure.

What is claimed is:

1. A method, comprising:
   interrogating, by a carrier gateway server, a database with a dialed number, the database including a direct inward dial number;
   creating, by the carrier gateway server, a call setup message addressed to an enterprise network with the dialed number; and
   routing, by the carrier gateway server, a call to the enterprise network in response to determining the dialed number matches the direct inward dial number or routing the call to a public switched telephone network in response to determining the dialed number does not match the direct inward dial number.

2. The method of claim 1, further comprising:
   publishing the direct inward dial number as part of a record in the database in association with a domain of the enterprise network.

3. The method of claim 1, further comprising:
   transmitting the call setup message to a session border controller.

4. The method of claim 3, wherein the session border controller routes the call setup message to the enterprise network.

5. The method of claim 1, wherein the routing the call to the enterprise network further comprises:
   routing the call to a private branch exchange deployed in the enterprise network.

6. The method of claim 1, wherein the receiving the direct inward dial number further comprises:
   receiving the direct inward dial number from an enterprise gateway server deployed in the enterprise network.

7. The method of claim 1, further comprising:
   determining, prior to routing the call to the enterprise network, a carrier network has sufficient capacity for routing the call.

8. The method of claim 1, further comprising:
   interrogating the database with a second dialed number in response to receipt of a second call setup that includes the second dialed number; and
   routing the call to the enterprise network by the public switched telephone network in response to determining the second dialed number does not match any direct inward dial number maintained in the database.

9. A non-transitory computer-readable storage medium having one or more computer-executable instructions that when executed by a processor cause the processor to:
   interrogate a database with a dialed number, the database including a direct inward dial number;
   create a call setup message addressed to an enterprise network with the dialed number; and
   route a call to the enterprise network by a carrier network in response to determining the dialed number matches the direct inward dial number or route the call to a public switched telephone network in response to determining the dialed number does not match the direct inward dial number.

10. The non-transitory computer-readable medium of claim 9, wherein the one or more instructions are further to cause the processor to:
   publish the direct inward dial number as part of a record in the database in association with a domain of the enterprise network.

11. The non-transitory computer-readable medium of claim 9, wherein the one or more instructions are further to cause the processor to:
   transmit the call setup message to a session border controller.

12. The non-transitory computer-readable medium of claim 11, wherein the session border controller routes the call setup message to the enterprise network.

13. The non-transitory computer-readable medium of claim 9, wherein the one or more instructions that cause the processor to route the call to the enterprise further cause the processor to:
   route the call to a private branch exchange deployed in the enterprise network.

14. The non-transitory computer-readable medium of claim 9, wherein the one or more instructions that cause the processor to receive the direct inward dial number further cause the processor to:
   receive the direct inward dial number from an enterprise gateway server deployed in the enterprise network.

15. The non-transitory computer-readable medium of claim 9, wherein the one or more instructions are further to cause the processor to:
   determine, prior to routing the call to the enterprise network, a carrier network has sufficient capacity for routing the call.

16. The non-transitory computer-readable medium of claim 9, wherein the one or more instructions are further to cause the processor to:
   interrogate the database with a second dialed number in response to receipt of a second call setup that includes the second dialed number; and
   route the call to the enterprise network by the public switched telephone network in response to determining the second dialed number does not match any direct inward dial number maintained in the database.

17. A system, comprising:
   a carrier network that includes a carrier gateway server; and
   an enterprise network that includes an enterprise gateway server configured to transmit a direct inward dial number to the carrier gateway server;
   wherein the carrier network is configured to:
      interrogate a database with a dialed number of a call setup message received by the carrier gateway server,
      create a call setup message addressed to the enterprise network with the dialed number, and
      route a call to the enterprise network in response to a determination that the dialed number matches the direct inward dial number or route the call by a public switched telephone network in response to a determination that the dialed number does not match the direct inward dial number.

18. The system of claim 17, wherein the carrier network comprises a communications network including:
   a Global System for Mobile communications network, an IS-41 or ANSI-41-compliant network, a WiMAX-compliant network, an IP Multimedia Subsystem-compliant network, a multimedia domain-compliant network, a Digital-Advanced Mobile Phone System, and a Universal Mobile Telephone System.

19. The system of claim 17, wherein the direct inward dial number is transmitted from the carrier gateway server to the enterprise gateway server via a web service interface.

20. The system of claim 17, wherein the database maintains a plurality of records each allocated for a respective direct inward dial number, and wherein each of the plurality of records associates a direct inward dial number with an enterprise network domain.

* * * * *